July 9, 1968   A. JACKNAU   3,391,625
INTERCHANGEABLE FILM HOLDER
Filed March 14, 1966   5 Sheets-Sheet 1

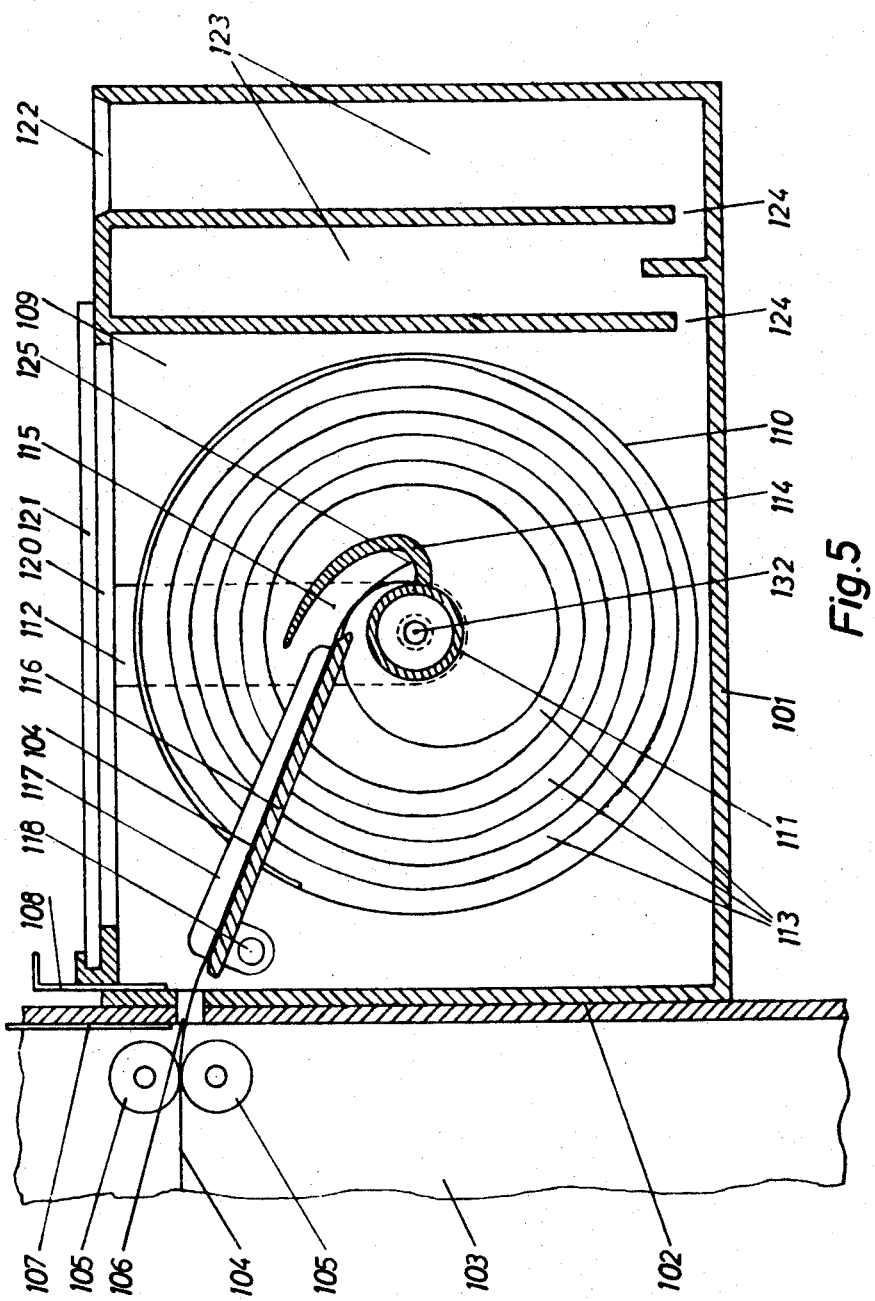

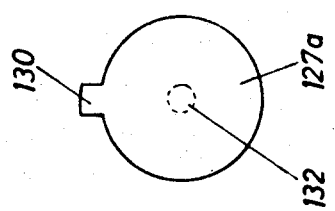
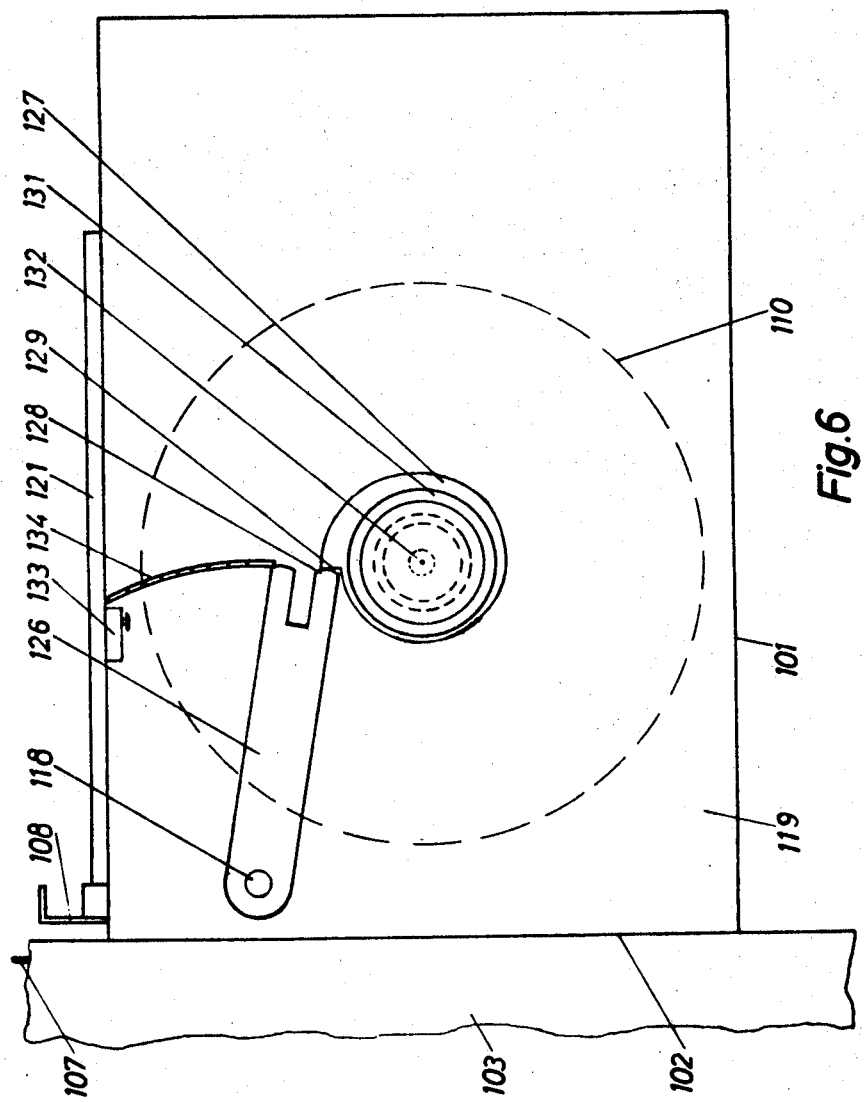

United States Patent Office 3,391,625
Patented July 9, 1968

3,391,625
INTERCHANGEABLE FILM HOLDER
Alex Jacknau, Berlin, Germany, assignor to Agfa-Gevaert
Aktiengesellschaft, Leverkusen, Germany
Filed Mar. 14, 1966, Ser. No. 534,221
Claims priority, application Germany, July 27, 1965,
J 28,658
10 Claims. (Cl. 95—13)

ABSTRACT OF THE DISCLOSURE

A film holder unit includes a main holder having an auxiliary film holder attached to and communicating with the main holder. A supply spool in the main holder feeds film over a film lead-tongue in the auxiliary holder to a development spool therein. The auxiliary holder is constructed as a tank development box so that the film received therein can be immediately processed.

---

This invention relates to interchangeable and separable film for use with cameras, and more particularly for use with microfilm equipment.

Conventional microfilm holders contain a donor spool for the unexposed film, a film winding device and the transfer reels for the film. The outside of the holder is usually equipped with a coupling link for removable connection with the driving mechanism of the microfilm apparatus, and whereby the axis of this coupling link also acts on the driving reels inside the holder.

Interchangeable film holders for cameras for microfilm equipment are known which contain both the donor spool for the unexposed film and the receiving spool for the exposed film within the holder. Such a known holder is internally equipped with driving reels for conveying the film, and these driving reels are actioned by an axis which protrudes outside the holder housing and is provided with a coupling link which works together with another coupling link in the driving mechanism of the microfilm apparatus.

The primary purpose of these known interchangeable film holders is to bring certain groups of photographic subjects, that is documents, drawings and the like, on-to certain film strips. This is only possible when several holders are available and can be attached interchangeably to the same microfilm camera. It is also advantageous if, in the interchange of the various holders among each other, no loss of film of any kind occurs, because an exposure taken much later always follows directly the previous exposure; this means that the holder has to be opened and the receiving spool removed and brought to development.

It is further known that for carrying out a single task, one can use several completely outfitted cameras which are then attached interchangeably to a photographic stand which includes, in the usual manner, the photographic table, the illuminating lamps and an arm which can be adjusted up and down. Such an arrangement, however, requires by its very nature, a high technical expenditure.

For some purposes, however, it is desirable to take only a few pictures in sequence and to bring these few pictures quickly and with the least possible loss of film to the development process. The opening of a known interchangeable film holder and the removal of a few exposures from the receiving spool always entails a high loss of film which frequently is not justified by the number of pictures which are to be quickly developed. For this reason, it is known that one can also equip the camera, in place of the known receiving spool, with a flat tube, also known as a strip holder, in which there is a frame into which a film strip is introduced. After a few exposures, this film strip can be cut off with the help of a known cutting device which is attached to the strip holder. Such a known strip holder can furthermore be attached to a development tank at its intake opening which is located on the underside. After opening the holder, the frame in which the film strip is located, slips down into the development tank. It is obvious that the strip holder and the development tank must be joined during this process so as to exclude any light.

This last named known device makes possible the development of a few exposures but, for reasons of construction, cannot be adapted to increase capacity. For example, although meter-long strip holders can be built, they cannot be used in practice. For these reasons, the capacity of a known strip holder is exhausted after only a few exposures, and it is not possible, in the manner described, to take tewnty or thirty pictures, for instance, and quickly develop them.

It is an object of this invention to avoid the disadvantages of the known devices described above, and to make an interchangeable film holder which permits an economical operation regardless of whether only a few or perhaps as many as thirty pictures are to be brought to rapid development.

The invention solves this problem in, for example, the following manner. On one side of the interchangeable hold, auxiliary holders of a different construction, designed to receive the exposed film, can be removably attached in such a way that their winding axles are driven in the operating position by the shaft of the coupling gear of the holder through transmission links. One of these auxiliary holders contains a known receiving spool to receive the exposed film, while the other auxiliary holder is constructed as a tank development box. The differently constructed auxiliary holders are removably attached to one surface of the holder which is at an angle greater than 90° to the axis of the intended objective. The highest point of the auxiliary holders in their operating position is higher than the upper surface of the holder itself. The auxiliary holders may contain a known film cutting device which is constructed in such a way that its knife is actioned by a spring, and that its built-in release hook is self-winding. In this manner when the knife is retracted, a cam which is attached to it comes to rest in a groove and keeps the knife in the retracted, position. Conversely when the cam is released from the groove, the knife springs back under the action of its spring and, in addition to cutting the film, brings about the light-proof closure of the film entrance slit in the auxiliary holders at the non-operating position of the latter. The middle coupling part for the actioning of the winding spool axis of the auxiliary holders can consist of a cogwheel which serves as an intermediate gear wheel and which is attached near one of the corners of the auxiliary holders. To the winding spool axis of the auxiliary holders, a cogwheel is rigidly attached and mates with the cogwheel acting as intermediate gear wheel which constitutes one of the coupling parts. The auxiliary holder, which is constructed as a tank development box, contains a spool equipped on its internal surfaces in the known way with spiral-shaped grooves.

A further refinement of this invention is especially designed to improve upon an advantageous holder which is equipped at both inner surfaces of its spool with spiral-shaped guide channels. In this advantageous holder the receiver spool can be driven, i.e., made to turn from the camera, via a friction safety clutch. In such a holder, the front end of the film must be firmly attached to the axle of the spool; this is accomplished by means of a clamp attached to a ribbon which is fastened to the spool axle. When the driven spool begins to turn, this relatively short ribbon is wound up on the spool axle and draws the film into the spiral shaped guide channels on the inner surfaces of the spool. After the spool has been partially or completely filled in this manner, the film is cut off. The modified device of this invention improves upon the following aspects of this device. First of all, the introduction of the film into the above-described holder must be accomplished while the holder is attached to the camera. This sometimes causes considerable difficulties since the spool must be taken out of the holder, and after the film is clamped onto the ribbon, the spool must be replaced in the holder, these steps are particularly awkward to carry out in cases where the camera is, for example, elevated. Also, the mechanical connection for driving the spool must be made between the holder and the camera. This process can be accomplished by means of an automatic coupling, but this procedure requires considerable technical expense. Moreover, this device requires the use of a friction safety clutch which regularly entails the inherent flaws of this mechanical element. For further discussion of the present technological state, see U.S. Patent 2,487,680, FIGS. 4–6, and U.S. Patent 3,041,952, FIG. 1; British Patents 5320 (1915) and 412,023; and German Patent 350,544, FIG. 1.

In the modified form of the invention the spool is constructed in such a way that on the axle of this known spool or in its vicinity, a pocket is attached. Outside of the holder, there is an indicator such as a disk which moves as the spool rotates and indicates any given position of the pocket in the interior of the holder. In this case, the film lead-tongue is connected to an axle, one end of which projects outside a side wall of the holder. This end is connected to a one-arm lever whose extremity rests on an indicator disk, at the start of the process of introducing the film into the holder, and this indicator is equipped with an attachment. Another form of execution of the invention provides that the outer rim of the disk is curve-shaped. In still another form of execution the disk includes at least one cam attached on its outer edge. The free end of the one-arm lever can be constructed as an indicator which moves over a scale. It is further provided that the holder has a contact which is touched by the lever at its end-position. Furthermore, when the holder is connected to a microfilm camera, the transfer rolls of the latter for the film are located near the opening for passing the film from the camera to the holder.

Novel features and advantages of the present invention will become apparent to one skilled in the art from a reading of the following description in conjunction with the accompanying drawings wherein similar reference characters refer to similar parts and in which:

FIG. 5 is a cross-sectional view of a modified auxiliary holder similar to that of FIGS. 3–4;

Figure 1:
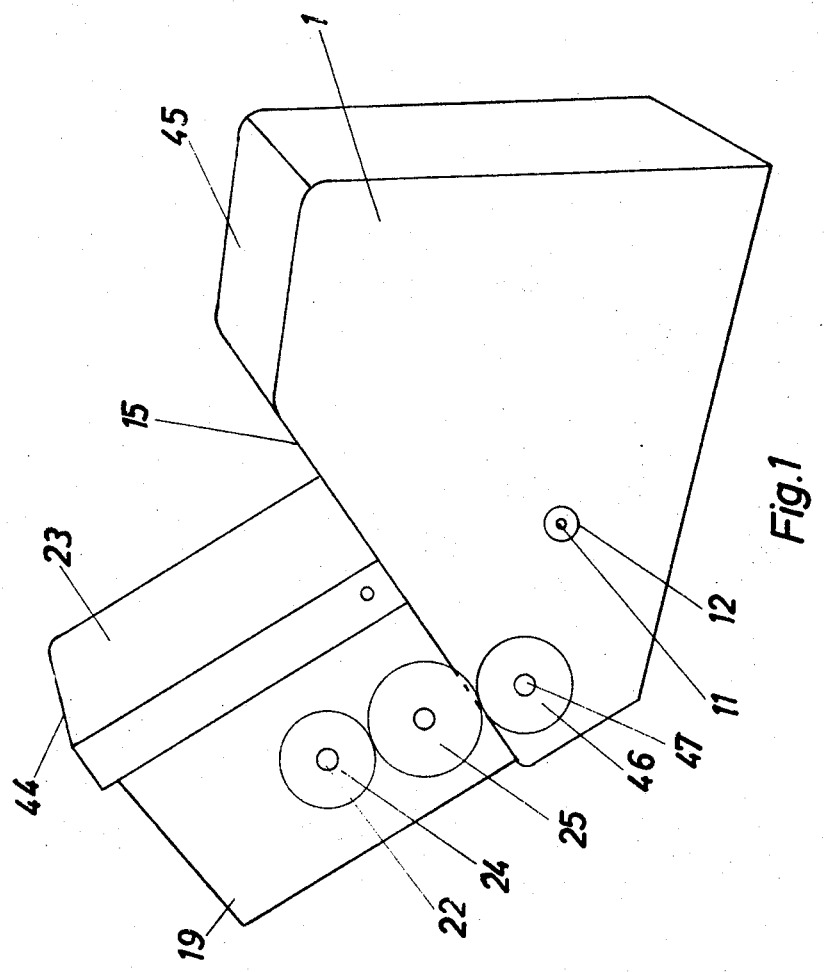
FIG. 1 is a perspective view of one embodiment of this invention showing an auxiliary holder attached to the film holder.
Figure 3:
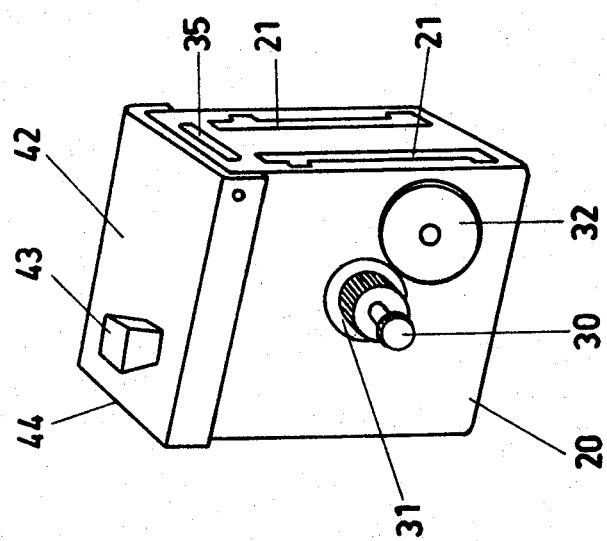
FIG. 3 is a perspective view of another auxiliary holder which may be attached to the film holder of FIGS. 1–2.
Figure 2:
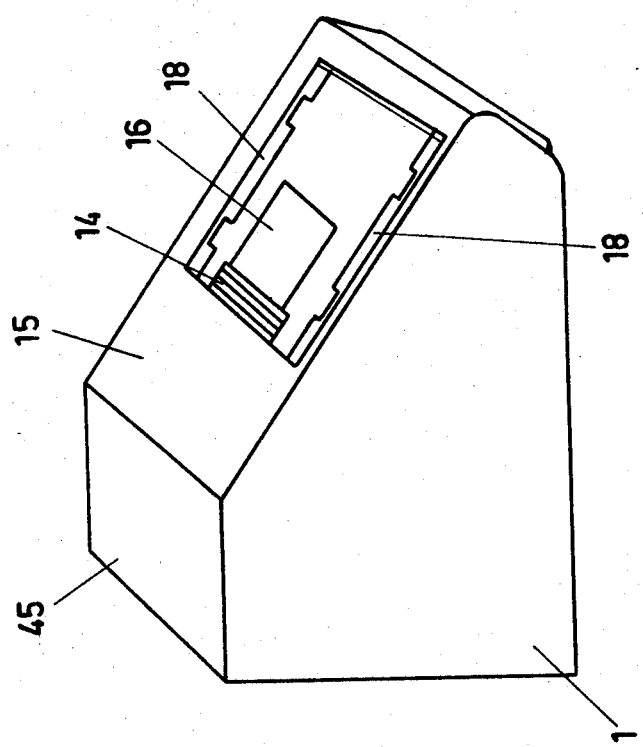
FIG. 2 is a perspective view of the film holder shown in FIG. 1.
Figure 4:
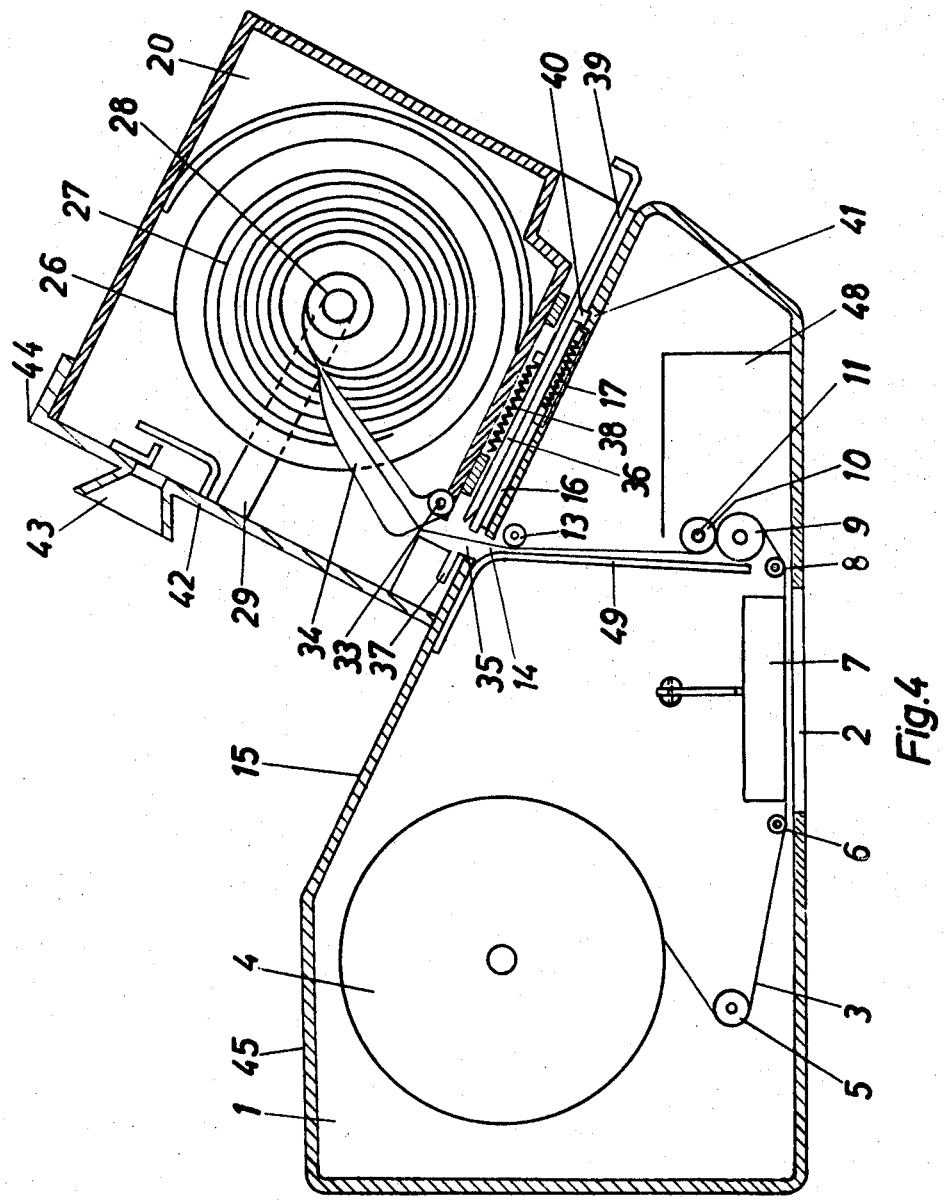
FIG. 4 is a cross-sectional view of the auxiliary holder of FIG. 3 attached to the film holder of FIGS. 1–2.

FIG. 6 is a side view of a portion of a camera and a holder formed in accordance with this invention which includes a lever-disk indicating arrangement; and FIG. 7 is a view of a modified form of indicating disk As shown in FIG. 4 the interchangeable film holder 1 is removably attached at its lower side in any desirable way onto the aperture of the microfilm apparatus (not shown). The lower surface of the holder is provided with an opening 2, through which the film 3 runs and through which the under side of the film makes contact with the tracks (not shown) of the aperture. Under these tracks, of course, are located the other usual parts of the microfilm apparatus, such as the objective shutter and the objective itself. Inside the film holder 1 is located the donor or feed spool 4 from which the film 3 is led over the transfer rolls 5 and 6 to the opening 2, above which there is a pressure plate 7. The film 3 runs further over the guide roll 8 between the transfer rolls 9 and 10. The axle or shaft 11 of the transfer 10 projects through the backwall of the film holder 1 and is joined externally to the film holder 1 rigidly by means of a coupling link 12 (FIG. 1). When the film holder 1 is placed upon the aperture of the microfilm apparatus, this coupling link 12 creates a connection with another coupling link (not shown) which is attached to the driving mechanism of the microfilm apparatus. Inside the film holder 1, the film now passes over the guide roll 13 into a slit 14 which is located in the upper oblique surface 15 of the film holder 1. This slit 14 can be made light-proof by means of a slide plate 16 which is actioned by a spring 17. On the oblique surface 15 of the film holder 1 are located any desired connecting elements 18 (FIG. 2) for the attachment of the auxiliary holders 19 (FIG. 1) and 20 (FIGS. 3 and 4) to this oblique surface 15. These auxiliary holders in turn are fitted with corresponding connecting elements 21. The connecting elements between the surface 15 and the auxiliary holders 19 and 20 may consist for example of recessed rails and the like.

The auxiliary holder 19 shown in FIG. 1 is a box-like structure inside which a known receiving spool is located on an axle 22, serving to receive the exposed film in any desired length until it is filled. This auxiliary holder 19 is made light-proof by means of a lid 23 on one of its sides, for example the upper side. The axle 22 of the auxiliary holder 19 is connected to a cogwheel 24 which mates with another cogwheel 25 attached near one corner of the outer wall of the auxiliary holder 19. Of course, the auxiliary holder 19 is provided with a slit (not shown) through which the film 3 can enter it. This slit can be closed, in the non-operating position of the holder, by means of a known slide plate or also by the knife of a cutting device, also known. The described auxiliary holder 19, therefore, serves in connection with the film holder 1, the same purpose as a known film holder in which both the donor spool and the receiving spool are located inside in the same space.

The function of the auxiliary holder 20, however, is quite different. Although holder 20 is similar in its external construction and size, as well as in the driving elements, to the auxiliary holder 19, it is equipped quite differently inside and with respect to the lid, because holder 20 at the same time functions as a tank development box.

As shown in FIG. 4 inside the auxiliary holder 20, there is a receiving spool 26 which has a spiral-shaped groove 27, known as such, on the inner surfaces of the disks of the spool. The groove 27 runs from the inside outward. The receiving spool 26 has at both its outer surfaces two axle journals 28 (also known) which move in grooves 29 located on two opposite inner surfaces of the auxiliary holder 20. The receiving spool 26 is connected by means of a knockout spindle which can be fixed, to a cogwheel 31 (FIG. 3) which, in turn, mates with another cogwheel 32, on the outside of the auxiliary holder 20. Between the inner surfaces of the receiving spool 26, there is also a movable film guiding part 34 which can oscillate around an axle 33. Furthermore, the auxiliary holder 20 possesses a film threading slit 35 which can be closed light-proof by means of the knife 36 of the film cutting device which enters into a slit 37. The knife 36 is activated by a spring 38 which acts toward the slit 37.

Furthermore, the knife 36 is provided with a spring activated release hook 39 which has a cam 40 which, when the release hook 39 is retracted comes to rest in a groove 41 against the action of the spring 38, whereby the film threading slit 35 is exposed. The auxiliary holder 20 has a removable cover 42 (in the known fashion) in which is located (also in the known manner) a filling hole 43 for the introduction of the developing liquid which consists preferably of a known fixative-developer.

The highest point 44 of the auxiliary holders 19 and 20 is above the highest surface 45 of the film holder 1 when they are set in the operating position on the oblique surface 15 of the film holder 1. On one of the outer walls of the film holder 1, there is near one of its corners another cogwheel 46 (FIG. 1), whose axle 47 is parallel to the axle 11 of the transfer roller 10. The axles 11 and 47 are connected mechanically with one another inside a gear box 48 (FIG. 4.). Inside the film holder 1 is also located a film guide 49 which facilitates the exit of the end of the film through the slit 14 in the oblique surface 15 of the film holder 1.

The mode of operation of the interchangeable film holder according to the invention is as follows:

The film holder can be utilized in two different ways. First, for the processing of long, connected film strips of approximately the length of the unexposed film on the donor spool 4. When such long film strips are to be produced, the auxiliary holder 19 is attached to the film holder 1 and, since the receiving spool of the auxiliary holder 19 has approximately the same capacity as the donor spool 4 in the film holder 1, all the unexposed film material on the donor spool 4 can be processed, if this is desired. After the pictures have been taken, the receiving spool is removed from the auxiliary holder 19 in the known manner, and brought to any desired development processing.

The second mode of utilization concerns the processing of short pieces of film whereby the few pictures taken on them are to be made available as quickly as possible. It is a question here of an approximate number of, for example, one to thirty exposures. In this case, the auxiliary holder 20 is attached to the film holder 1. After connecting the film or lead end of film 3 which protrudes out of the film holder 1 through the slit 14, with the receiving spool 26 of the auxiliary holder 20, the picture taking can begin. The receiving spool 26 is provided on its inner surfaces with the spiral-shaped groove 27 and, as it turns, draws the film 3 into these spiral-shaped channels 27. The individual loops of the film 3 lie in the receiving spool at some distance from each other and cannot touch each other, as is also known. The grooves 27 on the inner surfaces of the receiving spool 26 are long enough to receive a piece of film which contains, for example, approximately thirty exposures.

After taking the pictures, a few blank exposures are made until the last exposure made, which is located above the opening 2 of the film holder 1, comes into the receiving spool 26. The film 3 runs over the guide roll 8, the transfer rolls 9 and 10, the guide roll 13 and then passes through the slit 14 of the film holder 1 into the film threading slit 35 of the auxiliary holder 20. From here the film runs over the film guiding element 34 into the grooves 27 of the receiving spool 26. When the last exposed picture has been stored in the receiving spool 26, the release hook 39 of the knife 36 is raised, causing its cam 40 to come out of the groove 41. Now the knife 36, under the action of the spring 38, springs forward, cuts the film 3 and enters the slit 37 with its forward edge, whereby the film 3 is cut and at the same time the film threading slit 35 of the auxiliary holder 20 is closed light-proof.

Next the auxiliary holder 20 is removed from the oblique or slanted surface 15 of the film holder 1 by separating the connecting elements 18. The slit 14 in the oblique surface 15 is closed light-proof by the sliding plate 16 which is actioned by the spring 17. The auxiliary holder 20 can then be placed on the surface which is opposite the filling opening 43. After this the development fluid, such as a fixative developer, is poured into the auxiliary holder 20 through this filling opening 43. At the conclusion of the development process, the cover 42 of the auxiliary holder 20 is removed and after the knockout spindle 30 (FIG. 3) is withdrawn, the receiving spool 26 can be pulled out of the auxiliary holder 20. In this manner the axle journals 28 slide in the channels 29 and furthermore, the film guiding element 34 turns on its axis 33 and flaps up, so that it does not interfere with the removal of the receiving spool. (It is also possible to first remove the film guiding element 34 in order to take out the receiving spool 26.) The film 3 which is now completely developed and fixed, following the use of the fixative-developer, subsequently undergoes the known further processing; that is, rinsing and drying, whereupon it is ready for use. Of course, in place of a fixative-developer, one can also use, in the known manner, a normal developing process, upon which the developer is poured out of the auxiliary holder 20 and a fixative is poured into it.

Both auxiliary holders 19 and 20 can be equipped with a cutting device, but this is not absolutely necessary. It is also possible to use in place of the cutting device, a regular holder slide plate which closes the film-threading slit of the auxiliary holders.

The receiving spools of the two auxiliary holders 19 and 20 must be driven for winding the film 3. For this purpose, the invention of FIGS. 1–4 provides cogwheels 24 and 31, respectively, which are connected with the axles of the receiving spools. These cogwheels 24 and 31 are located on one of the outer surfaces of the auxiliary holders 19 and 20, and mate with a further cogwheel 25 and 32, respectively, which is in the shape of an intermediate wheel and is attached to the same outer surface of the auxiliary holders 19 and 20. When one of the auxiliary holders 19 or 20 is placed in the operating position, that is when one of the auxiliary holders 19 or 20 is connected to the oblique surface 15 of the film holder 1 by means of the connecting elements 21, then the cogwheel 25 automatically and simultaneously becomes connected when auxiliary holder 19 is used; or, when using auxiliary holder 20, the cogwheel 32 becomes connected with cogwheel 46 on one of the outer surfaces of the film holder 1. The axle 11 of the transfer reel 10 is mechanically connected inside the gear box 48 (FIG. 4) with the axle 47 of the cogwheel 46, whereby this cogwheel 46 is set in motion when the axle 11 turns. Since the axle 47 is rigidly connected to the cogwheel 46, cogwheel 46 drives cogwheel 25 which, in turn, drives cogwheel 24, whereby axle 22 turns and thus also the receiving spool rotates, so that the film 3 can be wound on it. All of these movements both within and outside the film holder 1 and both within and outside the auxiliary holders 19 and 20 orginate from the axle 11 to whose outer end coupling link 12 is rigidly connected. Link 12 is connected to the driving mechanism of the microfilm apparatus when the film holder 1 is attached to it. Of course, in these movements, known devices are included, such as for example a friction-safety clutch or the like, in order to accommodate the increasing diameter of the film on the receiving spools.

The advantages of the interchangeable film holder according to the invention consist primarily in that because of the interchangeable auxiliary holders of special construction, the film holder can be used for all purposes. It can be used as a film holder of the usual construction; however, it can also be used to make relatively short film strips, whereby the auxiliary holder intended for this purpose can simultaneously serve as a tank development box. This has the advantage that an additional separate development device for shorter film strips is not required. A further advantage consists in that the shorter film strips can contain anywhere between, for example, one and thirty exposures. In constrast with the conventional strip holders, it was only possible to bring a much smaller number of exposures to instant development. A further advantage consists in that after removal of the auxiliary holder from the film holder, the development process can begin immediately, and it is not necessary first to transfer the exposed film to another container. Due to the construction according to the invention of the film holder with its oblique surface, the auxiliary holder constructed as a tank development box can be brought very close to the transfer reels in the film holder, so that only minimal losses of film occur.

The invention is not limited to the mode of execution shown in the drawings. It is of course possible to vary the mode of construction of the individual parts, as long as, in doing so, the overall functioning of these parts with one another remains unchanged.

In the embodiment shown in FIGS. 5–7 and more particularly in FIG. 5 the film holder 101 is apposed through its surface 102 to a correspondingly shaped surface of the camera 103 and is joined to it by separable elements which do not constitute an object of the invention. The film 104 coming from the camera 103 is led by means of the transfer rolls 105 through an opening 106 in the camera 103 and in the film holder 101 into the interior of the latter. These openings 106 can be opened and closed, for example, by the slide plates 107 and 108. In the interior 109 of the film holder 101 is located the spool 110 with its axle journals 111 resting in indentations 112 on the inner wall, in such a manner that the spool 110 can rotate. The spool 110 is equipped on its inner surfaces with spiral-shaped grooves 113 and its hollow axle, also designated as 111, is joined to a guide element 114 thus forming a pocket 115. The film lead-tongue 116, which is equipped on both outer edges with elevated rims 117, is joined to an axle 118 which projects through the side wall 119 (FIG. 6) of the film holder 101. The upper opening 120 of the film holder 101 is closed light-proof by means of a cover 121 which can be secured in any desirable fashion. Near the edge of the upper surface of the film holder 101, there is an opening 122 which serves as the filling and emptying opening for developing liquids. The interior 109 of the film holder 101 also contains two chambers 123 which are connected to the interior 109 by an opening 124. The film 104 introduced into the film holder 101, makes contact with the starting end at the point 125, with the lower edge of the guiding element 114. The axle 118 projecting out of the side wall 119 is connected to the one-arm lever which rests with its lower edge 128 on the outer rim of the disk 127 (FIG. 6) when the spool 110 is empty. The disk 127, as shown in FIGURE 6, can be curve-shaped at its outer edge, whereby the curve is drawn in such a manner that an attachment or shoulder or stroke lifter 129 is formed at the location of its highest and lowest points. Another mode of execution, as shown in FIG. 7, provides a disk 127 and whose outer rim is circular and on which a cam 130 is attached. A turning knob 131 is mounted concentrically with disk 127 or 127a, respectively. The turning knob 131, as well as the disk 127 or the disk 127a, the side wall 119 and the axle 111 of the spool 110, and also the opposite lateral wall, contain a borehole 132 through which lies an axle (not shown), one of whose ends is provided with threads. Once it is introduced, this knockout spindle keeps all the parts in their respective positions, whereby the arrangement is such that all parts nevertheless remain easily movable. A contact point 133 and a scale 134 can be attached on the lateral wall 119.

The method of operation of the holder according to the invention is as follows:

The exposed film coming from the camera 103 is led by the transfer rolls 105 through the openings 106 and is advanced gradually onto the film lead-tongue whose edges 117 are somewhat closer together than the width of the film. In this way, the film 104 is curved or bent upwards somewhat.

The spool 110 placed in the interior 109 of the film holder 101 through the upper opening 120 is turned by means of the turning knob 131 so that its guiding part 114 is in the position indicated in FIG. 5 and so that the opening of the pocket 115 is directed toward the end of the film lead-tongue 116. Since the axle 111 of the spool 110 is rigidly attached to the guiding part 114, and since furthermore the spool 110 is in detachable but positive connection with the disk 127 or the disk 127a, respectively, with the help of entrainment means (not shown) the parts mentioned above move together. Hence the disk 127 or 127a acts as an indicator for the position in which the opening of the guiding part 114 and therefore the opening of the pocket 115 is placed. The arrangement is such that when the pocket 115 is in the correct position, the attachment 129 (FIG. 6) touches the edge 128 of the lever 126 or, in the case of the disk 127a, the cam 130. It is therefore possible without looking at the disk 127 or 127a (which acts as indicator) to bring the pocket 115 into the correct position by turning the turning knob 131 to the left or counterclockwise. This position is reached when the turning knob 131 cannot be moved further to the left.

When the holder is therefore set up to receive the exposed film 104, one can begin to take pictures with camera 103. After each exposure, the film is automatically moved forward by means of any desirable devices through the transfer rolls 105, onto the film lead-tongue 116, until its front end finally touches, at point 125, the lower end of the pocket 115.

As the film 104 advances, it moves the guiding part 114 which represents, so to speak, a lever for the axle 111, and thus sets this axle 111 also into motion and, with it, spool 110. As the spool 110 turns, the film is drawn into the spiral-shape grooves 113 of the spool 110, going from the center outward. Since the grooves 113 on the two inner surfaces of the spool 110 are mirror images of each other, the film can fit exactly into them. Each additional forward motion of the film 104 causes the spool 110 to move and to be filled more and more.

As the diameter of film in the spool 110 increases, the film lead-tongue 116 rises correspondingly and moves the axle 111 connected to it and thus also the lever 126 on the lateral wall 119 of the holder 101. Therefore, one can immediately see from the position of the lever 126 how much film 104 is already on the spool 110. A suitably calibrated scale 134 can also be used as an additional aid. The filling of the spool 110 can be interrupted at any time, if desired, for example when three, or eight, or fifteen exposures have been taken. Of course it is necessary to make a few blank exposures with the camera so that all the exposures in the camera 103 can reach the interior 109 of the film holder 101. It is obvious that one can make as many exposures as the dimensional capacity of the spool 110 will allow, taking care only that the blank exposures also reach the spool 110.

After the spool 110 has been filled as much as desired with exposure film 104, the film is cut off by means of a cutting device, and the openings 106 in the camera 103 and in the film holder 101 are closed. For example, the cutting can be by the slide plates 107 and 108. Of course, it is possible to make the closing of the slide plates automatic upon removal of the holder whereby in addition the cutting and closing processes can be combined.

The film holder 101 can be removed from the camera 103, and, after opening the lid 121 and removing the knockout spindle from the borehole 132, the spool 110 with the exposed film 104 which is on it, can be removed and the film developed in the usual manner in a dark room. Alternatively, the devleopment can take place without the help of a dark room because film holder 101 is constructed as a tank development box. In order to carry out the development prcoess outside of a dark room, a developing liquid, preferably a fixative-developer, is poured into the film holder 101 through the opening 122 and reaches the interior 109 of the holder 101 through the openings 124. The chambers 123 serve to prevent the entrance of light into the interior 109. Once the interior chamber 109 has been filled with developing liquid, the development process can begin. This process is facilitated by the motion of the film 104 and can progress uniformly. This motion is achieved by turning the spool 110 by means of the turning knob 131. After completion of the development, the developing liquid (after a suitable sweep process) is poured out of the film holder 101 through the opening 122. The spool 110 with the developed film can then be removed from the holder after opening the lid 121 and removing the knockout spindle from the borehole 132.

The invention also provides a contact 133, which is actioned by the lever 126 when the latter has reached its highest position. This occurs when the spool 110 has been filled almost completely with film 104. The contact 133 is really only a safety device and is not absolutely necessary. When the lever 126 touches the contact 133 an acoustical signal can be set off, for example, or the camera 103 can be stopped. The contact 133 is only intended as a source of impulse and the use of the impulse in any manner is optional. The advantages of the film holder according to the invention consist primarily in the simplicity of its operation and in its foolproof usage. An important advantage is that the attachment of the film end in the holder by means of a clamp and ribbon is not required. A further advantage is that one eliminates the unnecessary effort and inconvenience required of attaching the holder to the camera. A further advantage is that the holder can also be equipped with a normal film receiver spool, that is, a spool which does not have spiral-shaped grooves on its inner surfaces. It can therefore be used in the usual previously known manner. A very important advantage is the fact that with the use of the holder according to the invention, relatively short film strips or also longer ones, up to an approximate length of 2 meters, can be made. Another advantage is that the construction of the holder makes an additional development device for shorter film strips unnecessary. Additional development devices such as were previously required can be eliminated. After removing the holder from the camera, the development process can be immediately begun and it is not necessary to transfer the exposed film into another container. Finally, it is an advantage that the amount of film in the holder can be ascertained from the outside at any given time, thus eliminating practically all errors of operation.

The invention is not restricted to the form of execution shown in the drawings. It is of course possible to vary the construction of the different parts provided the overall functioning of these parts with one another is not changed by so doing. Thus, different kinds of disks can be utilized, for example, or the turning knob can be replaced by a toggle or a crank. It is also possible to form the lever in a different shape, or to use in place of the holder sliding plate, a different light-proof closure for closing the opening. It is only essential that the principle of the main concept of the invention, which is the driving of the spool by the film itself, be kept unchanged. The size of the spool itself is unimportant, and it can be made much larger than is shown in the drawings. It is only important to provide the spool with an easily operating seating, so that the advancing film can move it and be drawn into its grooves; this process takes place without any difficulty due to a slight upward curving of the film. The type of film used is also optional and it is only necessary that the film base possess sufficient mechanical strength.

What is claimed is:

1. In a film holder unit having a main holder with a supply spool and with auxiliary film holder attaching means, an auxiliary film holder attached to said attaching means and communicating with said main holder whereby film may be fed from said supply spool to said auxiliary film holder, characterized in that said auxiliary film holder is constructed as a tank development box, a development spool being in said box, a catching pocket being on said development spool near its axis thereof, said catching pocket having a film-receiving position, a film lead-tongue being in said box directed toward said pocket when said pocket is in said film-receiving position for guiding the film fed from said supply spool to said pocket, spiral-shaped guide means on said development spool for receiving the film upon rotation of said development spool, and rotatable indicating means mounted externally of said box and connected to said development spool to indicate when said pocket is in its film-receiving position.

2. A film holder unit as set forth in claim 1 wherein a non-circular wheel is mounted externally of said box and connected to said development spool, a contact lever being mounted externally of said box and connected to said tongue for rotation therewith, and said lever being disposed against said wheel.

3. A film holder unit as set forth in claim 2 including latch means for maintaining said pocket in its film-receiving position.

4. A film holder unit as set forth in claim 3 wherein said wheel includes at least one stroke lifter on its periphery for reacting against said lever.

5. A film holder unit as set forth in claim 2 wherein a scale is provided on said box adjacent said lever, and said lever acts as an indicator for said scale in accordance with the position of said wheel whereby said wheel, lever and scale comprise said indicating means.

6. A film holder unit as set forth in claim 2 wherein contact means is mounted on said box for actuation by said lever at the end of the winding process.

7. In a film holder unit having a main holder with a supply spool and with auxiliary film holder attaching means, an auxiliary film holder attached to said attaching means and communicating with said main holder whereby film may be fed from said supply spool to said auxiliary film holder, characterized in that said auxiliary film holder is constructed as a tank development box, a development spool being in said box, a film lead-tongue in said box adjacent said development spool for guiding the film fed from said supply spool to said development spool, spiral shaped guide means on said development spool for receiving the film fed thereto upon rotation of said development spool, and coupling means connecting said supply spool with said development spool for driving said development spool in accordance with the movement of said supply spool.

8. In a film holder unit having a main holder with a supply spool and with auxiliary film holder attaching means, an auxiliary film holder attached to said attaching means and communicating with said main holder whereby film may be fed from said supply spool to said auxiliary film holder, characterized in that said auxiliary film holder is constructed as a tank development box, a development spool being in said box, a film lead-tongue in said box adjacent said development spool for guiding the film fed from said supply spool to said development spool, spiral shaped guide means on said development spool for receiving the film fed thereto upon rotation of said development spool, film cutting means being in said auxiliary holder, said film cutting means including a knife, resilient means reacting against said knife, built-in self-winding release hook means including a groove in said auxiliary holder, a cam attached to said knife for movement into and out of said groove whereby said knife is in a retracted position when said cam is disposed in said groove and said knife is urged in a film cutting direction when said cam is out of said groove to cut the film and light-seal the film entrance to said auxiliary holder.

9. A film holder unit as set forth in claim 7 said coupling means including middle coupling means for winding said spool in said auxiliary holder, said middle coupling means having a cogwheel which acts as an intermediate gear and which is mounted near one of the corners of the auxiliary holder.

10. A film holder unit as set forth in claim 9 wherein said coupling means further includes a winding spool shaft for said spool in said auxiliary holder, a second cogwheel mounted on said shaft and meshing with said intermediate gear, and a further cogwheel near one of the corners of said main holder meshing with said intermediate gear.

References Cited
UNITED STATES PATENTS

| | | | |
|---|---|---|---|
| 1,359,481 | 11/1920 | Beidler | 95—90.5 |
| 2,214,581 | 9/1940 | Freeman | 95—90.5 |
| 3,296,949 | 1/1967 | Bounds | 95—12.5 |

NORTON ANSHER, *Primary Examiner.*

GARY M. HOFFMAN, *Assistant Examiner.*